F. McDONOUGH.
Lubricator.
No. 226,868.                                    Patented April 27, 1880.
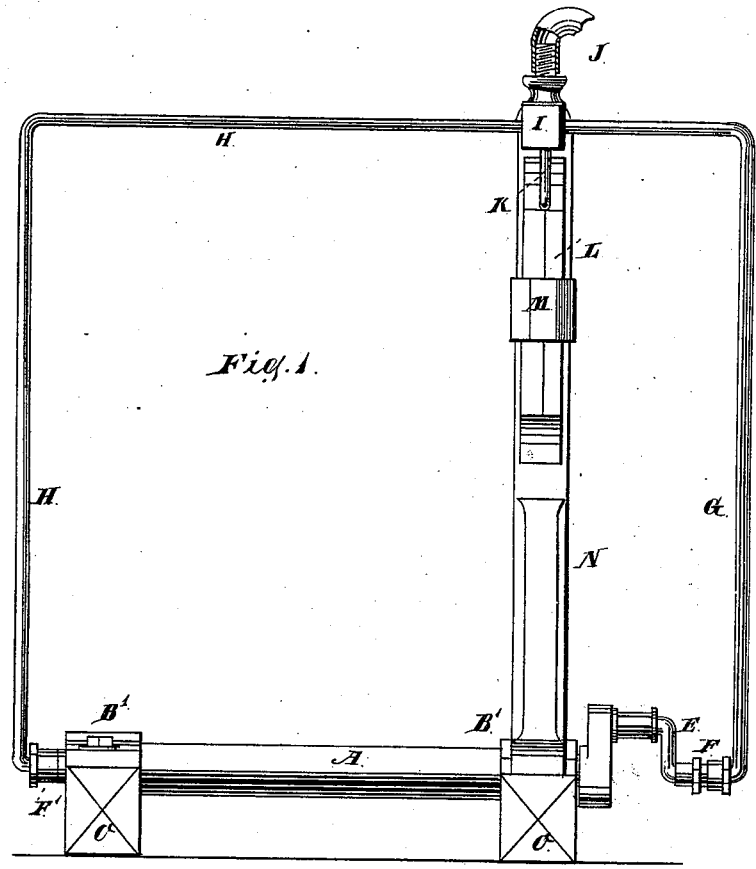
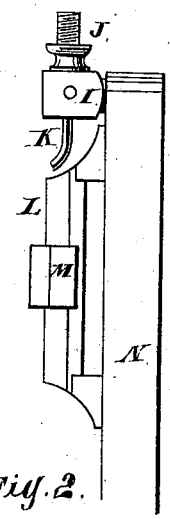
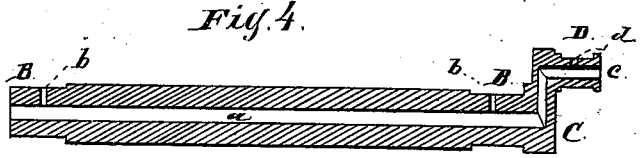
Witnesses:                                      Inventor:

UNITED STATES PATENT OFFICE.

FRANK McDONOUGH, OF EAU CLAIRE, WISCONSIN.

LUBRICATOR.

SPECIFICATION forming part of Letters Patent No. 226,868, dated April 27, 1880.

Application filed April 28, 1879.

*To all whom it may concern:*

Be it known that I, FRANK McDONOUGH, of Eau Claire, Eau Claire county, State of Wisconsin, have invented new and useful Improvements in Lubricators for Shafts and other devices, of which the following is a full description, reference being had to the accompanying drawings, in which—

Figure 1 is a side elevation, showing the devices for applying water to a wrist-pin and shaft-journal and to a slide; Fig. 2, a detail showing the supply-tank with pipe for supplying water to a slide; Fig. 3, a cross-section of the slide, and Fig. 4 a vertical longitudinal section of a shaft and crank with water-passage.

This invention relates to devices by which water as a lubricator can be applied to machinery, and has for its object the application of such lubricant, so as to properly lubricate the parts and keep them cool; and its nature consists in providing the journal, shaft, wrist-pin, or other device with an opening or passage, through which the water can flow, and from which it can be discharged at the point required; in providing a tank and pipes or tubes leading therefrom for conducting the water into the device to be lubricated; in providing stuffing-boxes in connection with the supply pipes or tubes and the device to be lubricated, so arranged as not to interfere with the movements of the device in supplying the water thereto, and in the parts hereinafter set forth as new.

In the drawings, A represents the shaft; B, the journals; B', the journal-bearings; C, the crank; D, the wrist-pin; E, the tube or pipe connecting the wrist-pin with the stuffing-box; F F', the stuffing-boxes; G H, the supply-pipes; I, the supply-tank; J, the filling nozzle or pipe; K, the pipe for applying the water to a sliding head; L, the support or guide for the sliding head; M, the sliding head; N, the upright or post of the frame; O, the base of the frame; $a$, the passage or hole through the shaft; $b$, the discharge-orifices; $c$, the passage through the crank and wrist-pin, and $d$ the discharge-orifice.

The parts represented by the letters A, B, B', C, and D may be of any of the ordinary and well-known forms of construction for such parts, except that the shaft A has a passage or hole, $a$, through its center, extending its entire length, with small orifices $b$ leading therefrom to the journal-bearings B', and the crank C, with its wrist-pin D, has a central passage or opening, $c$, communicating with the opening $a$, with an orifice, $d$, leading to the outside of the wrist-pin, as shown in Fig. 4.

The passage $c$ is connected with a stuffing-box, F, of suitable construction, by a short pipe or tube, E, so attached to the stuffing-box as to allow the crank to revolve, and to the other side of this stuffing-box F is attached the tube G, which terminates in a tank, I, suitably constructed to contain a supply of water, which tank may be filled by means of a pipe or nozzle, J, or in any other convenient manner.

The end of the shaft A is connected with a stuffing-box, F', so as to allow the shaft to revolve, and to the other side of the stuffing-box F' is attached a pipe or tube, H, which also terminates in the tank I.

For lubricating a wrist-pin and journal the water is taken from the tank I by the tube G, which, through the stuffing-box F and pipe E, conveys the water into the central opening, $c$, to the journal, and discharges it through the openings $d\ b$ to the outside of the crank-pin and journal.

For lubricating a shaft and crank the water is taken from the tank I by the tube H, which conveys it through the stuffing-box F into the central opening, $a$, from which it can escape through the holes or orifices $b$ to the outside of the shaft-journals. By this arrangement water can be applied to cranks, wrist-pins, shafts, and other devices, so as to lubricate the parts and save a large proportion of the expense and trouble now attending the proper lubrication of such devices; and the supply will be continuous, so that no stoppage need occur, and adding very much to the capacity of the devices in the time saved.

By means of the tube or pipe K water can be discharged from the tank I, so as to lubricate a slide or other reciprocating device, as the head M, which moves on its guides or track L, these parts being of the usual construction.

It will be seen that in the form shown the water for the crank-pin is delivered at a point on the same level as the center of the shaft, which facilitates its being carried into the crank or wrist-pin.

An opening from the passage c in the wrist-pin, extending to outside, may be made through the collar of such pin to form an outlet for any water not used in lubricating.

For many purposes the pipe G, for supplying the water to a wrist-pin, need only be used. For applying water to the bearings of a shaft either or both pipes or tubes G H may be used.

As shown, the tank I is located directly over the reciprocating slide; but it may be located in any other suitable position and the pipe K arranged to convey the water to the slide.

The pipe G, stuffing-box F, and pipe E might be used to supply oil as a lubricator to a wrist-pin; and when the wrist-pin only is to be lubricated the shaft need not be provided with a central passage.

What I claim as new, and desire to secure by Letters Patent, is—

1. The tank I and tube G, in combination with the stuffing-box F, pipe E, and a hollow crank and wrist-pin, substantially as and for the purposes specified.

2. The tank I and tube H, in combination with the stuffing-box F' and a hollow shaft or journal, substantially as and for the purposes specified.

3. The tubes G H, in combination with the shaft, journal, crank, and wrist-pin or other device provided with central openings or passages and orifices or holes leading therefrom to the part to be lubricated, whereby water can be discharged from the interior to the exterior, substantially as and for the purpose set forth.

4. The pipe K, leading from a water-supply tank, in combination with a fixed bearing for a slide or other reciprocating device for applying water thereto for lubricating purposes, substantially as specified.

5. The pipes or tubes G, H, and K, terminating in a common water-supply tank, and arranged and adapted to discharge or supply the water to the bearings B, B', D, and L, for lubricating purposes, substantially as specified.

FRANK McDONOUGH.

Witnesses:
C. W. SPAULDING,
R. H. CHUTE.